(12) United States Patent
Iida

(10) Patent No.: US 10,705,777 B2
(45) Date of Patent: Jul. 7, 2020

(54) INFORMATION PROCESSING APPARATUS, IMAGE FORMING APPARATUS, AND STORAGE MEDIUM THAT ENABLE PRINTING WHILE RECEIVING RANDOM ACCESS DOCUMENT FILE

(71) Applicant: Hirokazu Iida, Kanagawa (JP)

(72) Inventor: Hirokazu Iida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/289,769

(22) Filed: Mar. 1, 2019

(65) Prior Publication Data
US 2019/0278542 A1    Sep. 12, 2019

(30) Foreign Application Priority Data

Mar. 9, 2018    (JP) .................... 2018-043629

(51) Int. Cl.
   *G06F 3/12*    (2006.01)
   *H04N 1/32*    (2006.01)
   *H04N 1/44*    (2006.01)

(52) U.S. Cl.
   CPC .......... *G06F 3/1247* (2013.01); *G06F 3/1206* (2013.01); *G06F 3/1222* (2013.01); *G06F 3/1238* (2013.01); *G06F 3/1253* (2013.01); *H04N 1/32149* (2013.01); *H04N 1/4486* (2013.01)

(58) Field of Classification Search
   CPC .... G06F 3/1247; G06F 3/1206; G06F 3/1238; G06F 3/1222; G06F 3/1253; G06F 3/1248; H04N 1/32149
   See application file for complete search history.

(56) References Cited

U.S. PATENT DOCUMENTS

| | | |
|---|---|---|
| 8,239,956 B2 | 8/2012 | Fukasawa |
| 2005/0141010 A1 | 6/2005 | Kanai |
| 2009/0135448 A1* | 5/2009 | Kawara ................. G06F 21/608 |
| | | 358/1.15 |

FOREIGN PATENT DOCUMENTS

| | | |
|---|---|---|
| JP | 2004-348423 | 12/2004 |
| JP | 2015-026134 | 2/2015 |

OTHER PUBLICATIONS

Extended European Search Report for 19160868.6 dated Jul. 16, 2019.

* cited by examiner

*Primary Examiner* — Kent Yip
(74) *Attorney, Agent, or Firm* — IPUSA, PLLC

(57) ABSTRACT

An information processing apparatus communicating with an image forming apparatus includes a memory that stores a program and a processor that executes the program stored in the memory to perform a process. The process includes receiving a first document file including multiple sets of encrypted page data of pages, arranging the sets of the encrypted page data in page order, attaching identification information for identifying a page data boundary to each of the arranged sets of the encrypted page data, obtaining decoding information for decoding the sets of the encrypted page data from the first document file, generating a second document file including the arranged sets of the encrypted page data and the decoding information disposed before the arranged sets of the encrypted page data, and transmitting the generated second document file to the image forming apparatus.

11 Claims, 15 Drawing Sheets

%PDF-1.7 — 510

520

10obj
<</Pages20R/Type/Catalog>>
endobj

20obj
<</Kids[30R]/Type/Pages/Count1>>
endobj

50obj
... — 521

60obj
... — 522

70obj
... — 523

⋮ xref
0000000000 65535 f
0000000016 00000 n
... — 530 trailer
<<
/Root 10R
/Size 10
/ID [ ] — 541
>>
startxref
Xxxxxx
%%EOF
— 540

INFORMATION PROCESSING APPARATUS, IMAGE FORMING APPARATUS, AND STORAGE MEDIUM THAT ENABLE PRINTING WHILE RECEIVING RANDOM ACCESS DOCUMENT FILE

CROSS-REFERENCE TO RELATED APPLICATION

The present application claims priority under 35 U.S.C. § 119 to Japanese Patent Application No. 2018-043629, filed on Mar. 9, 2018. The contents of which are incorporated herein by reference in their entirety.

BACKGROUND OF THE INVENTION

1. Field of the Invention

An aspect of this disclosure relates to an information processing apparatus, an image forming apparatus, an image processing system, an image processing method, and a storage medium.

2. Description of the Related Art

Examples of image forming apparatuses include a printer including a print function and a multifunction peripheral/printer/product (MFP) including a scan function, a copy function, a print function, and a facsimile function in one body. For example, an image forming apparatus receives print data in various formats such as Printer Control Language (PCL) (registered trademark), PostScript (PS) (registered trademark), and Portable Document Format (PDF) (registered trademark), and performs a printing process according to the print data.

In a sequential access file such as a PCL file or a PS file, sets of page data representing pages are arranged in page order. Therefore, an image forming apparatus can read and print sets of page data sequentially while receiving a sequential access file.

On the other hand, in a random access file such as a PDF file, sets of page data may be arranged randomly regardless of the order of pages. For this reason, an image forming apparatus needs to receive the entire random access file and refer to file configuration information disposed near the end of the random access file to access and print each set of page data.

Japanese Laid-Open Patent Publication No. 2004-348423, for example, discloses a system where PDF data to be printed is divided into multiple data blocks corresponding to pages, the last data block is transmitted first to an image forming apparatus, and then the remaining data blocks are transmitted sequentially from the first data block to the image forming apparatus.

According to the technology disclosed in Japanese Laid-Open Patent Publication No. 2004-348423, file configuration information disposed near the end of a file is transmitted first. With this technology, an image forming apparatus can read and print page data while receiving a random access file such as a PDF file.

However, with the technology disclosed in Japanese Laid-Open Patent Publication No. 2004-348423, because a document file is transmitted and received according to a unique procedure, it is not possible to transmit a document file according to the procedure to an image forming apparatus not supporting the procedure.

Accordingly, there is a demand for a technology that enables an image forming apparatus to print pages in a random access document file such as a PDF file while receiving the document file and while maintaining the compatibility of the document file with general image forming apparatuses. However, when, for example, a PDF file is encrypted, because information necessary for decoding (decryption) is stored in file configuration information disposed near the end of the PDF file, it is not possible to start printing before receiving the file configuration information.

SUMMARY OF THE INVENTION

According to an aspect of this disclosure, there is provided an information processing apparatus communicating with an image forming apparatus. The information processing apparatus includes a memory that stores a program and a processor that executes the program stored in the memory to perform a process. The process includes receiving a first document file including multiple sets of encrypted page data of pages, arranging the sets of the encrypted page data in page order, attaching identification information for identifying a page data boundary to each of the arranged sets of the encrypted page data, obtaining decoding information for decoding the sets of the encrypted page data from the first document file, generating a second document file including the arranged sets of the encrypted page data and the decoding information disposed before the arranged sets of the encrypted page data, and transmitting the generated second document file to the image forming apparatus.

BRIEF DESCRIPTION OF THE DRAWINGS

FIG. 5 is a drawing illustrating a data structure of a PDF file according to an embodiment;

DESCRIPTION OF THE EMBODIMENTS

Embodiments of the present invention are described below with reference to the accompanying drawings.

First Embodiment

<System Configuration>

Figure 1:
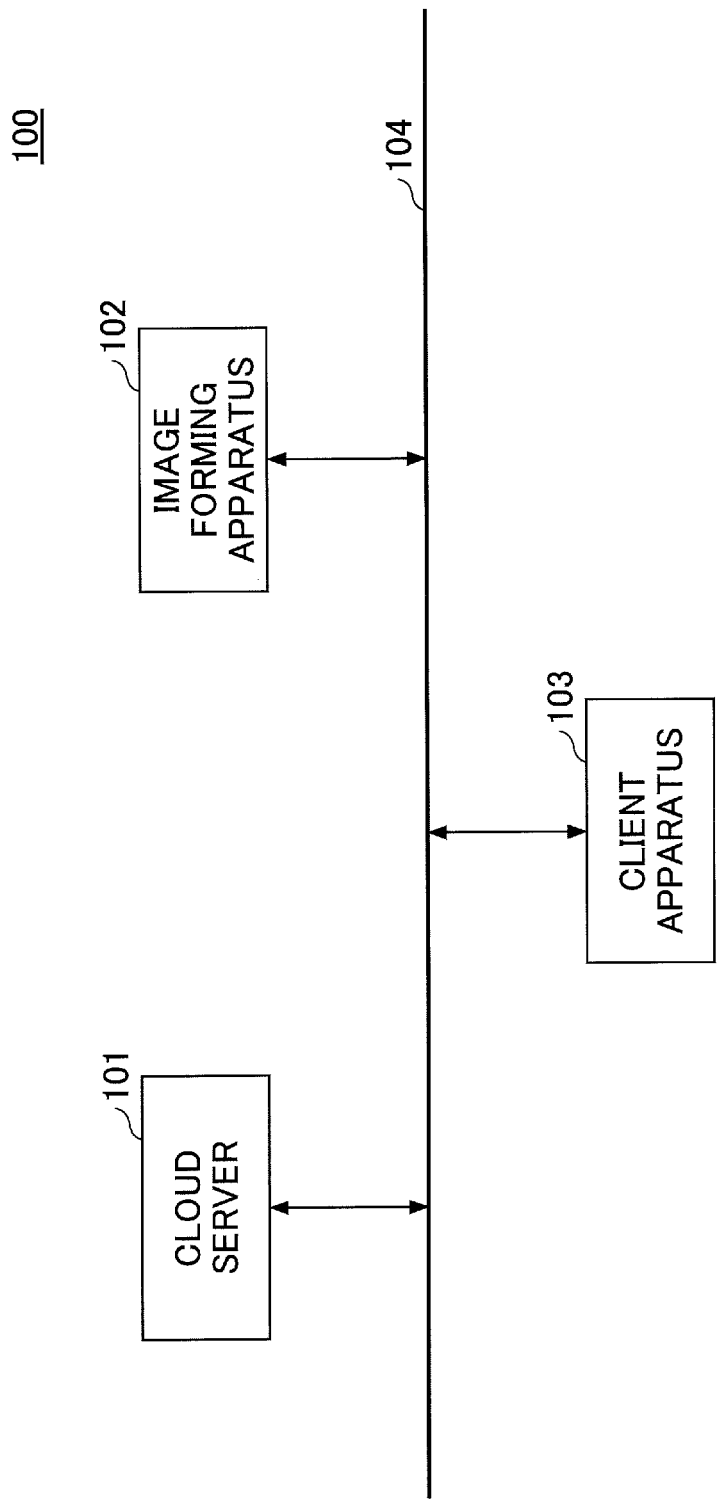
FIG. 1 is a drawing illustrating a configuration of an image processing system according to an embodiment.

FIG. 1 is a drawing illustrating a configuration of an image processing system 100 according to a first embodiment. The image processing system 100 includes a cloud server 101, an image forming apparatus 102, and a client apparatus 103 that are connected to a network 104 such as the Internet or a local area network (LAN). The cloud server 101, the image forming apparatus 102, and the client apparatus 103 can communicate with each other via the network 104.

The cloud server (information processing apparatus) 101 is an information processing apparatus such as a personal computer (PC) or a system including multiple information processing apparatuses. For example, the cloud server 101 functions as a print server that manages document files such as Portable Document Format (PDF) (registered trademark) files and transmits the document files to the image forming apparatus 102 according to requests from the client apparatus 103 and the image forming apparatus 102. The cloud server 101 also includes a function to convert document files.

The image forming apparatus 102 is an electronic apparatus such as a multifunction peripheral/printer/product (MFP) that includes a scan function, a copy function, a print function, and a facsimile function in one body.

The client apparatus 103 is an information terminal used by a user such as a PC, a tablet PC, a smartphone, a video conference machine, an electronic white board, a scanner, or a digital camera.

In the above configuration, a user uses the client apparatus 103 to transmit, for example, an encrypted PDF file (which is an example of a document file including multiple sets of encrypted page data) to the cloud server 101.

The cloud server 101 receives the PDF file transmitted from the client apparatus 103, and converts the received PDF file to generate a splittable PDF file that can be split into pages. Also, the cloud server 101 transmits the generated splittable PDF file to the image forming apparatus 102 and requests the image forming apparatus 102 to print the splittable PDF file.

An outline of a splittable PDF file is described here. In a random access file such as a PDF file, sets of page data of respective pages may be arranged randomly regardless of the order of pages. For this reason, when printing a PDF file, the image forming apparatus 102 needs to receive the entire PDF file and refer to file configuration information disposed near the end of the PDF file to print each set of page data.

Also, in an encrypted PDF file, decoding information (e.g., encryption dictionary, ID information, and so on) for decoding multiple encrypted pages is included in file configuration information disposed near the end of the PDF file. Accordingly, with the related-art technology, the image forming apparatus 102 cannot start printing pages in an encrypted PDF file until the entire PDF file is received.

To solve this problem, the cloud server 101 of the present embodiment includes a function to arrange multiple sets of page data included in an encrypted PDF file in page order and attach identification information for identifying a data boundary to each set of page data. Also, the cloud server 101 includes a function to obtain decoding information from an encrypted PDF file and generate a "splittable PDF file" in which the decoding information is disposed before multiple sets of encrypted page data.

Thus, in a splittable PDF file generated by the cloud server 101, decoding information for decoding multiple sets of encrypted page data is disposed before the multiple sets of encrypted page data. Also, in a splittable PDF file, sets of encrypted page data are arranged in page order, and identification information for identifying a page data boundary is attached to each set of page data.

In response to a print request from the cloud server 101, the image forming apparatus 102 prints, for example, a splittable PDF file received from the cloud server 101. The image forming apparatus 102 obtains decoding information from an encrypted PDF file, decodes sets of encrypted page data in the order they are received by using the obtained decoding information, and sequentially prints the sets of decoded page data.

A splittable PDF file generated by the cloud server 101 preferably includes file configuration information disposed near the end of the PDF file as in a normal PDF file. With this configuration, even an image forming apparatus not supporting the splittable PDF file can decode and print multiple sets of page data by referring to file configuration information disposed near the end of the splittable PDF file after receiving the entire splittable PDF file.

Thus, the image processing system 100 of the present embodiment enables an image forming apparatus to print pages in an encrypted document file such as a PDF file while receiving the document file and while maintaining the compatibility of the document file with general image forming apparatuses.

<Hardware Configurations>

(Hardware Configuration of Computer)

Figure 2:
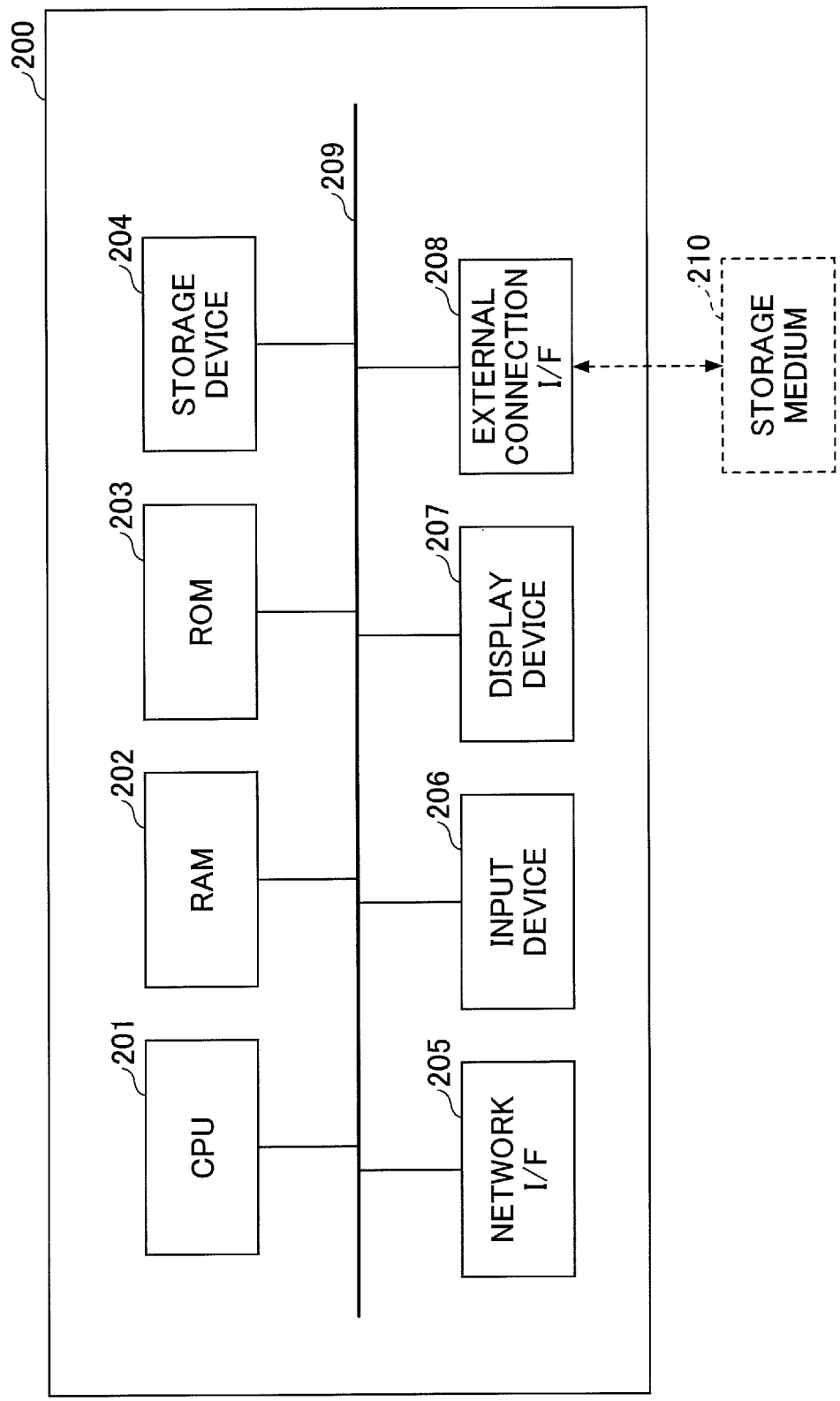
FIG. 2 is a block diagram illustrating a hardware configuration of a computer according to an embodiment.

Each of the cloud server 101 and the client apparatus 103 in FIG. 1 may be implemented by a computer having a hardware configuration as illustrated in FIG. 2.

FIG. 2 is a block diagram illustrating a hardware configuration of a computer 200 according to an embodiment. The computer 200 includes, for example, a central processing unit (CPU) 201, a random access memory (RAM) 202, a read-only memory (ROM) 203, a storage device 204, a network interface (I/F) 205, an input device 206, a display device 207, an external connection I/f 208, and a bus 209.

The CPU 201 loads programs and data stored in the ROM 203 and the storage device 204 into the RAM 202, and executes the loaded programs to implement various functions of the computer 200. The RAM 202 is a volatile memory used as a work area for the CPU 201. The ROM 203 is a non-volatile memory that can retain programs and data even when power is turned off.

The storage device 204 is a mass storage device such as a hard disk drive (HDD) or a solid state drive (SSD) and stores, for example, an operating system (OS), applications, and various types of data. The network I/F 205 is a communication interface for connecting the computer 200 to, for example, the network 104.

The input device 206 includes, for example, a keyboard and/or a pointing device such as a mouse, and is used to input instructions (or operation signals) to the computer 200. The display device 207 displays, for example, processing results of the computer 200.

The external connection I/F 208 is an interface for connecting the computer 200 to an external device such as a storage medium 210. The bus 209 connects the above components of the computer 200 to each other, and transmits address signals, data signals, and various control signals.

(Hardware Configuration of Image forming Apparatus)

Figure 3:
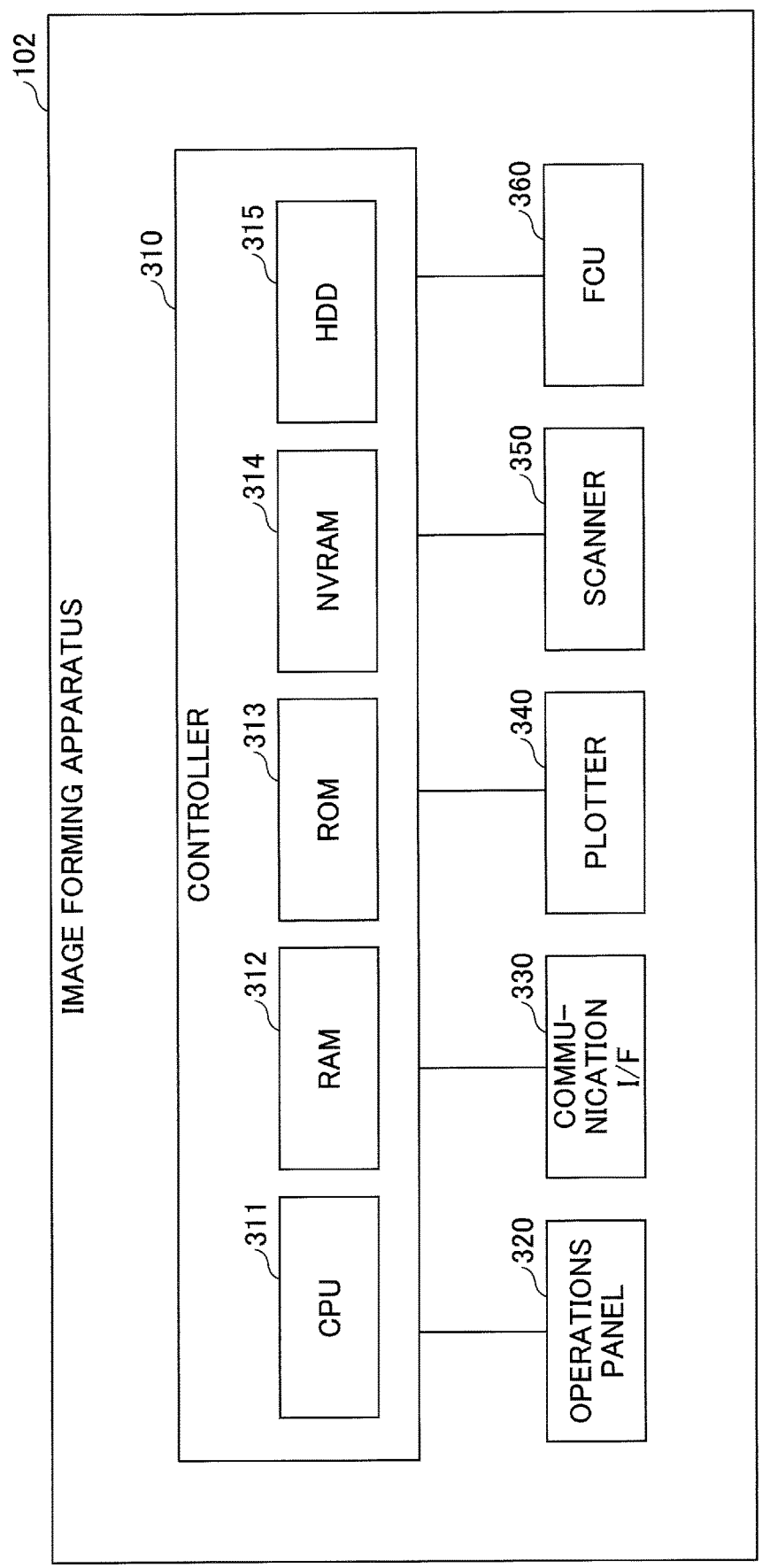
FIG. 3 is a block diagram illustrating a hardware configuration of an image forming apparatus according to an embodiment.

FIG. 3 is a block diagram illustrating a hardware configuration of the image forming apparatus 102 according to an embodiment. The image forming apparatus 102 includes, for example, a controller 310, an operations panel 320, a communication I/F 330, a plotter 340, a scanner 350, and a fax control unit (FCU) 360.

The controller 310 is a computer and includes, for example, a CPU 311, a RAM 312, a ROM 313, a non-volatile RAM (NVRAM) 314, and an HDD 315.

The ROM 313 is a non-volatile storage device for storing various programs and data. The RAM 312 is a volatile storage device for temporarily storing programs and data. The NVRAM 314 is a writable non-volatile storage device for storing, for example, configuration information. The HDD 315 is a mass storage device for storing various programs and data.

The CPU 311 is a processor that loads programs, data, and configuration information from the ROM 313, the NVRAM 314, and the HDD 315 into the RAM 312, and executes the loaded programs to control the image forming apparatus 102 and implement functions of the image forming apparatus 102.

The operations panel 320 includes an input unit for receiving user inputs and a display unit for displaying information. The communication I/F 330 is a communication interface for connecting the image forming apparatus 102 to the network 104.

The plotter 340 prints data on a recording medium. The scanner 350 scans a document to obtain image data. The FCU 360 transmits and receives facsimile data.

<Functional Configurations>

Figure 4:
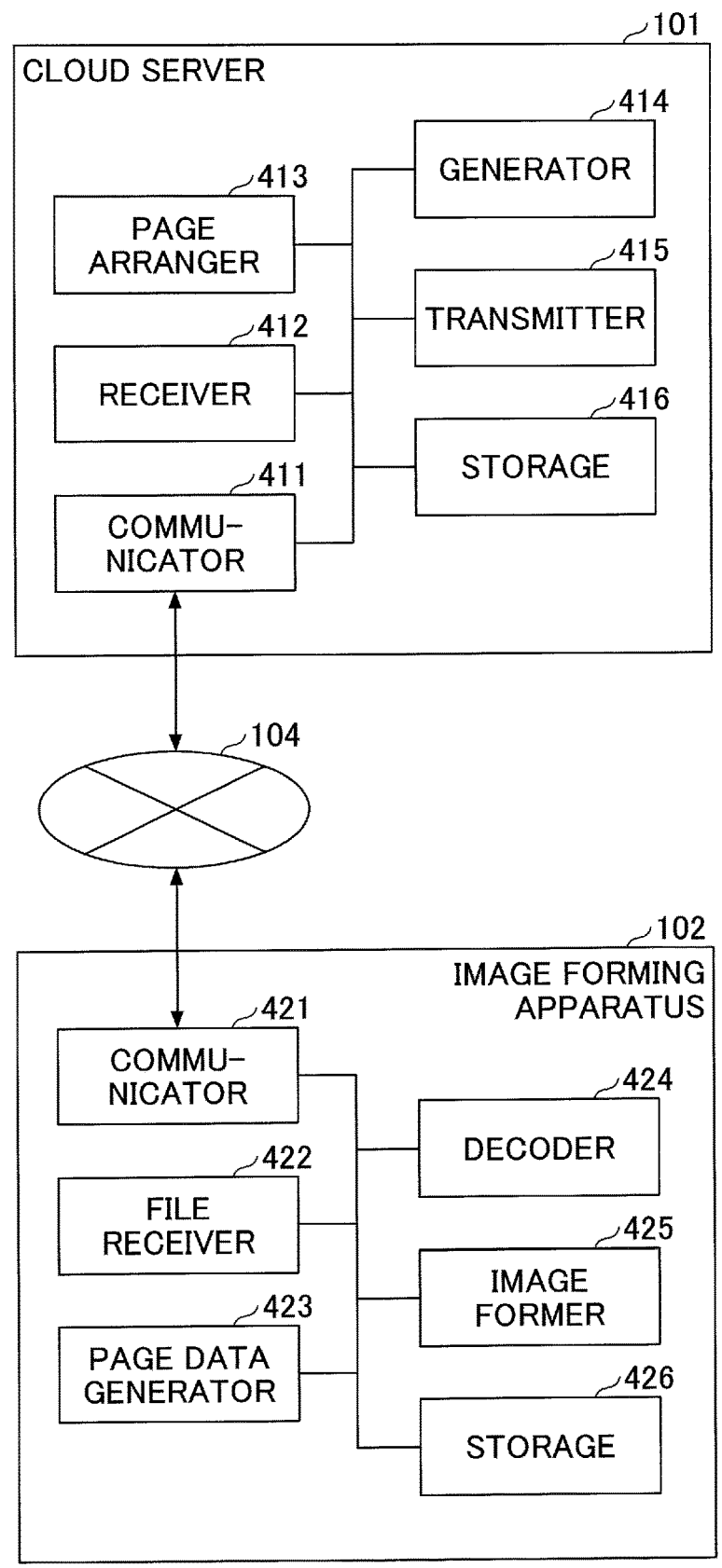
FIG. 4 is a drawing illustrating functional configurations of a cloud server and an image forming apparatus.

FIG. 4 is a drawing illustrating functional configurations of the cloud server 101 and the image forming apparatus 102.

(Functional Configuration of Cloud Server)

The cloud server 101 includes, for example, a communicator 411, a receiver 412, a page arranger 413, a generator 414, a transmitter 415, and a storage 416.

For example, these functional components of the cloud server 101 may be implemented by executing programs by the CPU 201 in FIG. 2. Also, at least some of the functional components may be implemented by hardware.

For example, the communicator 411 is implemented by the network I/F 205 and a program executed by the CPU 201 in FIG. 2, and connects the cloud server 101 to the network 104 to communicate with the image forming apparatus 102 and the client apparatus 103.

The receiver 412 receives an encrypted PDF file transmitted from, for example, the client apparatus 103.

The encrypted PDF file is an example of a first document file including multiple sets of encrypted page data. The first document file may also be a file that is different from the encrypted PDF file but has a format similar to the encrypted PDF file. In the descriptions below, it is assumed that the first document file is an encrypted PDF file.

The page arranger (arranger) 413 arranges, in page order, multiple sets of page data included in the encrypted PDF file received by the receiver 412, and attaches identification information for identifying a page data boundary to each set of page data. The identification information for identifying a page data boundary is described later.

The generator 414 obtains, from the encrypted PDF file (first document file) received by the receiver 412, decoding information (e.g., encryption dictionary, ID information, etc.) for decoding multiple sets of page data included in the encrypted PDF file. Also, the generator 414 generates a splittable PDF file (second document file) that includes the obtained decoding information before the multiple sets of page data arranged by the page arranger 413.

The splittable PDF file generated by the generator 414 preferably includes file configuration information indicating the configuration of the splittable PDF file after the multiple sets of page data arranged by the page arranger 413.

The splittable PDF file generated by the generator 414 preferably includes information indicating that the file is a splittable PDF file in, for example, a header disposed before the multiple sets of page data arranged by the page arranger 413.

According to a request from, for example, the client apparatus 103, the transmitter 415 transmits the splittable PDF file generated by the generator 414 to the image forming apparatus 102 and requests the image forming apparatus 102 to print the splittable PDF file.

For example, the storage 416 is implemented by the storage device 204, the RAM 202, and a program executed by the CPU 201 in FIG. 2, and stores encrypted PDF files received by the receiver 412 and splittable PDF files generated by the generator 414.

The splittable PDF file is an example of the second document file generated by the generator 414. The second document file may also be a file that is different from a PDF file but has a configuration similar to that of a PDF file.

(Functional Configuration of Image forming Apparatus)

The image forming apparatus 102 includes, for example, a communicator 421, a file receiver 422, a page data generator 423, a decoder 424, an image former 425, and a storage 426.

For example, these functional components of the image forming apparatus 102 may be implemented by executing programs by the CPU 311 in FIG. 3. Also, at least some of the functional components may be implemented by hardware.

For example, the communicator 421 is implemented by the communication I/F 330 and a program executed by the CPU 311 in FIG. 3, and connects the image forming apparatus 102 to the network 104 to communicate with the cloud server 101 and the client apparatus 103.

The file receiver 422 receives print data such as a splittable PDF file from the cloud server 101.

According to identification information for identifying data boundaries, the page data generator 423 splits the sets of encrypted page data included in the splittable PDF file received by the file receiver 422 and generates "split files" each containing a set of page data.

The decoder 424 stores decoding information such as encryption dictionary and/or ID information included in the splittable PDF file received by the file receiver 422 in the storage 426, and decodes the split files generated by the page data generator 423 using the stored decoding information.

The image former 425 prints data in each of the split files decoded by the decoder 424 by using, for example, the plotter 340 in FIG. 3.

For example, the storage 426 is implemented by the HDD 315, the RAM 312, and a program executed by the CPU 311 in FIG. 3, and stores decoding information included in the encrypted PDF file.

(Structure of PDF File)

Next, an outline of the structure of a PDF file is described.

FIG. 5 is a drawing illustrating a data structure of a PDF file 500 according to an embodiment. The PDF file 500 conforms to an open standard being managed by International Organization for Standardization (ISO), and includes four sections, i.e., a header 510, a body 520, a cross-reference table 530, and a trailer 540 that are arranged in this order from the beginning. Information included in each section in FIG. 5 is just an example.

The header 510 includes information such as a PDF version.

The body 520 includes objects. Each object is identified by an object number and defined by Information such as a document catalog, page information, and page content data. Each object number is composed of, for example, a reference number (X), a generation number (Y), and a character string "obj" as in "10obj". The document catalog is information indicating the root (the highest level) of an object hierarchy. The page information includes, for example, reference information referring to page content data. The page content data includes data for drawing each page.

The cross-reference table 530 starts from a line where a keyword "xref" is written and includes, for example, positions (offsets) of objects defined in the body 520. In the body 520 of a PDF file, objects (data) of pages may be disposed randomly. For example, in FIG. 5, an object 521 with an object number "50obj" may be page data of page 5, an object 522 with an object number "60obj" may be page data of page 1, and an object 523 with an object number "70obj" may be page data of page 3.

Each of the cloud server 101 and the image forming apparatus 102 identifies objects (data) of pages using the cross-reference table 530.

The trailer 540 is disposed at the end of the PDF file and includes keywords such as "trailer", "startxref", and "% % EOF".

The last line of the PDF file includes "% % EOF" that indicates the end of file. Also, the two lines before "% % EOF" include the keyword "startxref" and an offset value (byte location from the beginning of the PDF file) indicating the location of the cross-reference table 530.

The keyword "trailer" and a trailer dictionary enclosed between "<<"" and ">>" are located before the keyword "startxref". In the trailer dictionary, keys (e.g., /Root and /Size) are associated with values (e.g., 10R and 10).

Because the image forming apparatus 102 generally uses information such as the cross-reference table 530 and the trailer 540 to print a PDF file, the image forming apparatus 102 starts printing the PDF file after the entire PDF file is stored in a storage.

Figure 6:
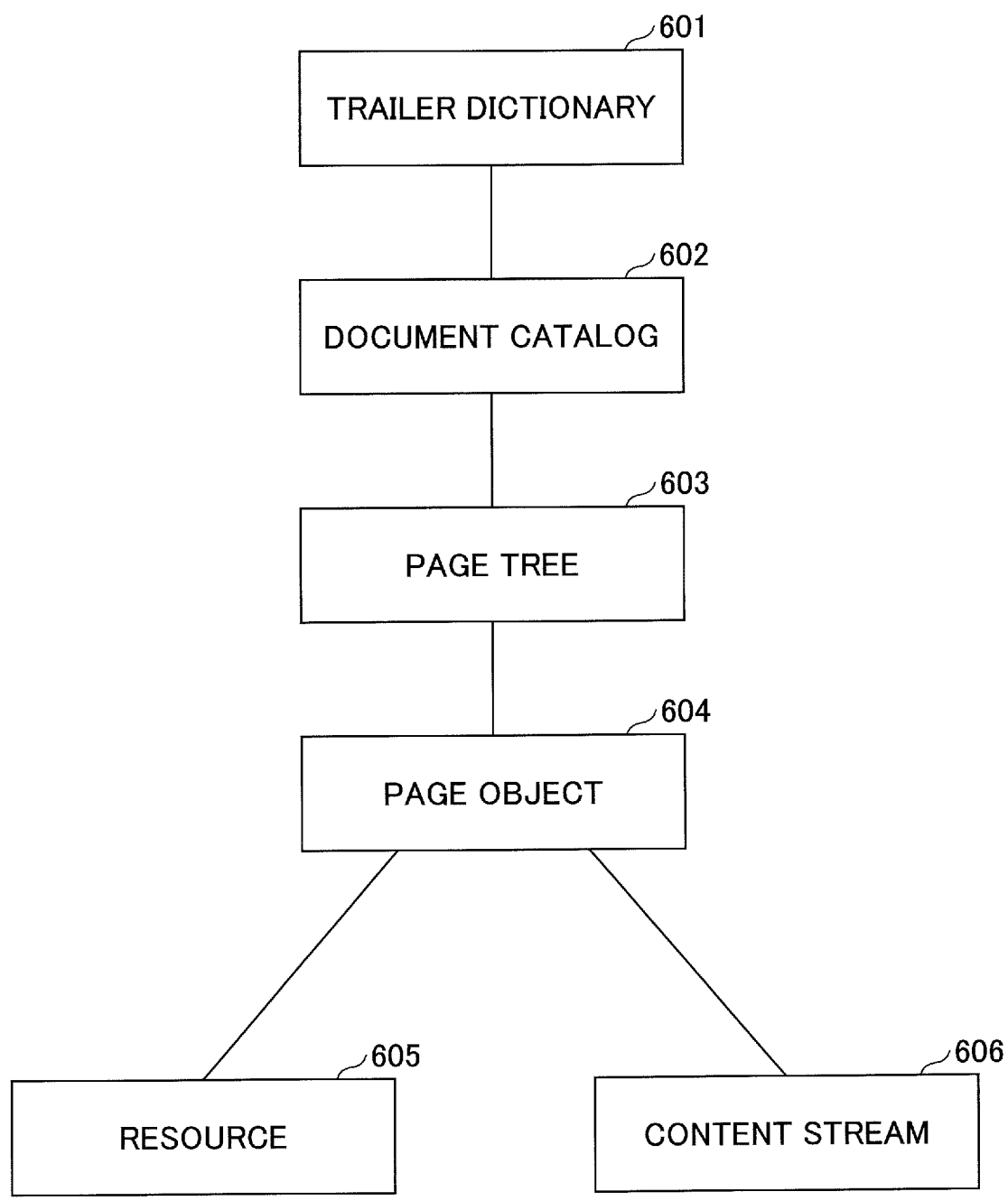
FIG. 6 is a drawing illustrating a logical structure of a PDF file according to an embodiment.

FIG. 6 is a drawing illustrating a logical structure of a PDF file according to an embodiment. FIG. 6 illustrates the logical structure of objects included in the body 520 in FIG. 5.

As illustrated in FIG. 6, a trailer dictionary 601 exists at the highest level of the logical structure of the PDF file. A document catalog 602, which is the root of the logical structure, is located below the trailer dictionary 601. The document catalog 602 includes a page tree 603, and the page tree 603 includes a page object 604 indicating information of each page.

The page object 604 includes a resource 605 that defines resources such as fonts and images of each page, and a content stream 606 such as drawing data.

Figure 7:
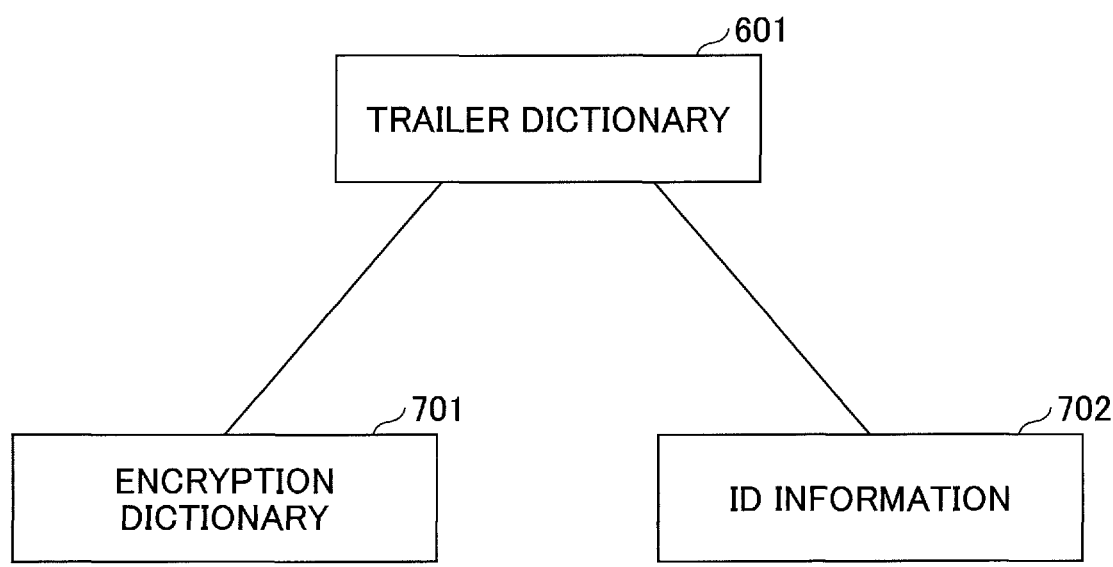
FIG. 7 is a drawing illustrating another logical structure of a PDF file according to an embodiment.

FIG. 7 is a drawing illustrating another logical structure of a PDF file according to an embodiment. An encrypted PDF file includes a logical structure as illustrated in FIG. 7 in addition to the logical structure illustrated in FIG. 6. In the example of FIG. 7, the encrypted PDF file includes an encryption dictionary 701 and ID information 702 below the trailer dictionary 601.

The encryption dictionary 701 includes, for example, a password used for encryption and information indicating items (e.g., printing, viewing, and an encryption scheme) that the user is allowed to access.

The ID information 702 is, for example, identification information registered under a key "/ID" in the trailer dictionary in the trailer 540 of FIG. 5, and is represented by a 32-character hex string used in a combined algorithm defined by the PDF language specification. The encryption dictionary 701 and the ID information 702 are examples of decoding information used to decode page data in an encrypted PDF file.

According to the PDF language specification, the encryption dictionary 701 may be defined in any location, but the ID information 702 needs to be defined in the trailer 540. Because the image forming apparatus 102 generally uses ID information to decode an encrypted PDF file, the image forming apparatus 102 starts decoding page data after the entire PDF file is stored in a storage.

In the present embodiment, the cloud server 101 includes a function to arrange multiple sets of page data included in an encrypted PDF file in page order and attach identification information for identifying a data boundary to each set of page data. Also, the cloud server 101 includes a function to obtain decoding information from an encrypted PDF file and generate a "splittable PDF file" in which the decoding information is disposed before multiple sets of encrypted page data.

With the splittable PDF file generated by the cloud server 101, the image forming apparatus 102 can obtain decoding information before receiving sets of page data and print the page data while receiving the PDF file.

<Process Flow>

Next, an image processing method according to the first embodiment is described.

(Process Performed by Cloud Server)

Figure 8:
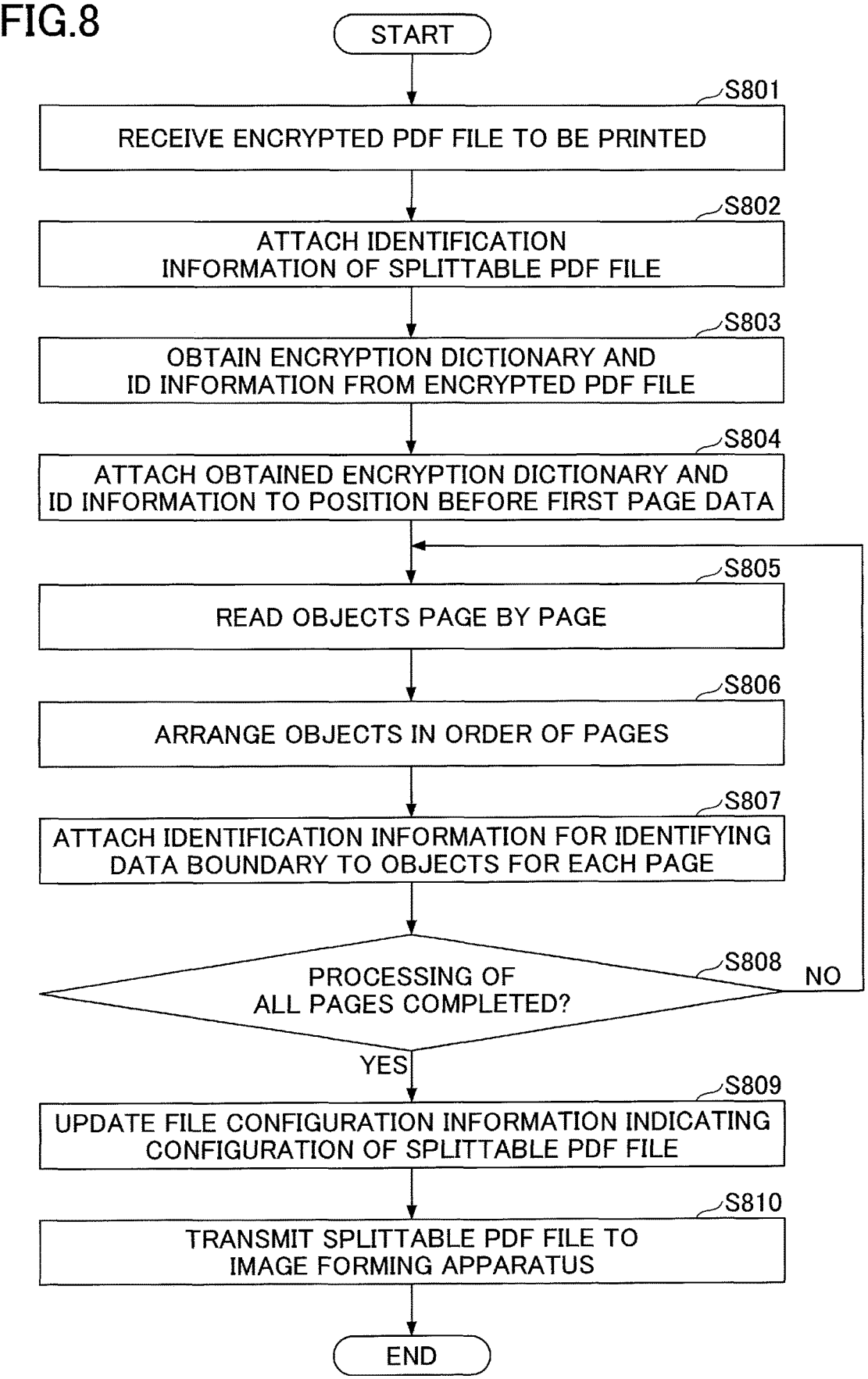
FIG. 8 is a flowchart illustrating a process performed by a cloud server according to a first embodiment.

FIG. 8 is a flowchart illustrating a process performed by the cloud server 101 according to the first embodiment. In this example, the cloud server 101 performs the process upon receiving an encrypted PDF file to be printed from the client apparatus 103.

At step S801, the receiver 412 of the cloud server 101 receives an encrypted PDF file (first document file) to be printed from the client apparatus 103.

At step S802, the generator 414 of the cloud server 101 attaches splittable PDF file identification information (information identifying a splittable PDF file as a type of file) to a splittable PDF file (second document file) being generated. The splittable PDF file identification information is, for example, a character string such as "% Enable Page Split Mode".

Figure 9:
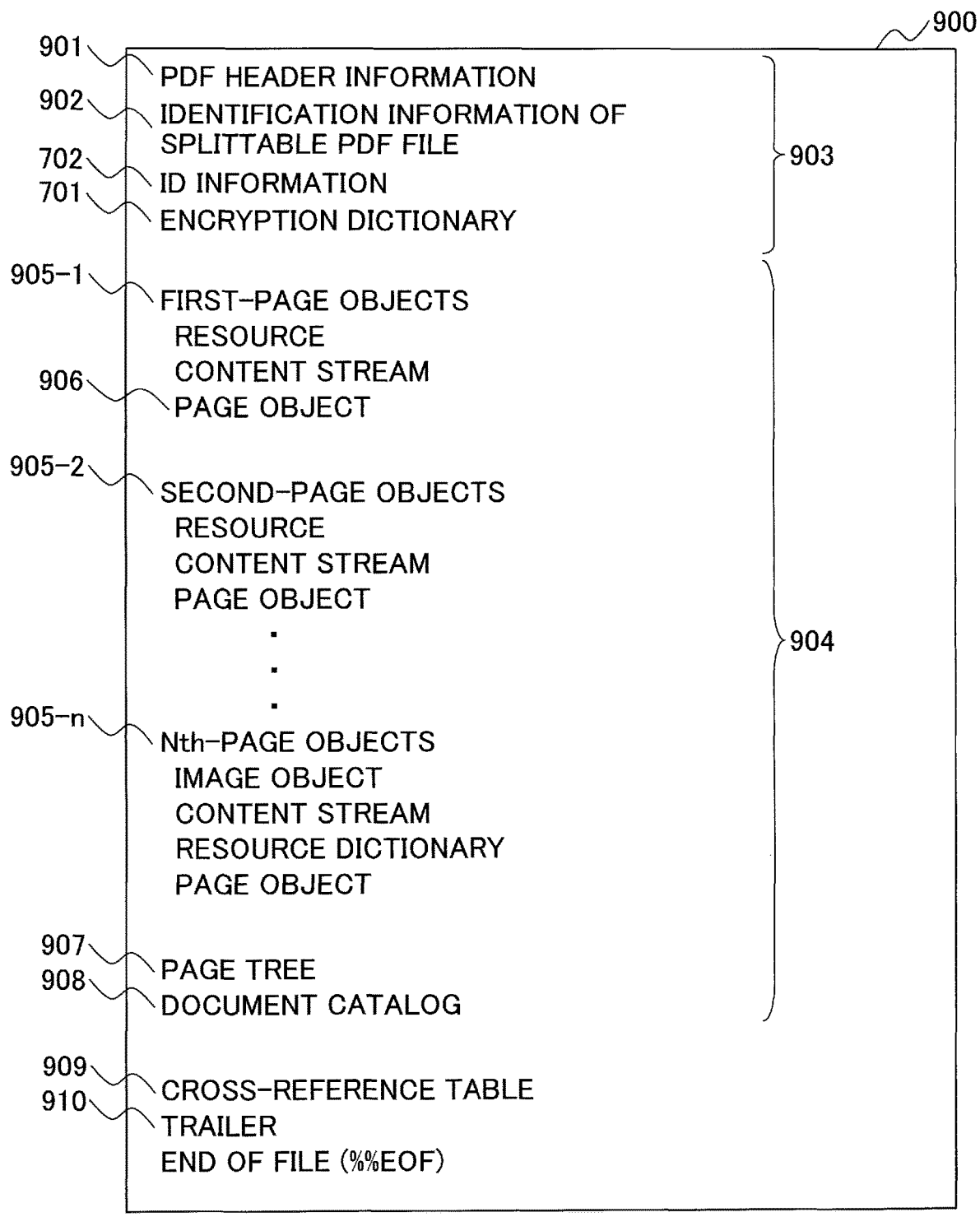
FIG. 9 is a drawing illustrating a data structure of a splittable PDF file according to the first embodiment.

FIG. 9 is a drawing illustrating a data structure of a splittable PDF file according to the first embodiment. As illustrated in FIG. 9, similarly to the PDF file 500 in FIG. 5, PDF header information 901 such as "% PDF-1.7" is written at the beginning of a splittable PDF file 900.

Also, by step S802, splittable PDF file Identification information 902 such as "% Enable Page Split Mode" is written after, for example, the PDF header information 901.

As an example, the splittable PDF file Identification information 902 is added to a header 903 of the splittable PDF file 900.

At step S803 of FIG. 8, the generator 414 obtains the encryption dictionary 701 and the ID information 702 described with reference to FIG. 7 from the encrypted PDF file. Here, in the encrypted PDF file, data and character strings in the content stream 606 described with reference to FIG. 6 are encrypted, and information such as the cross-reference table 530 and the trailer 540 are not encrypted.

At step S804, the generator 414 inserts decoding information such as the encryption dictionary 701 and the ID information 702 obtained at step S803 before first page data (page data of page 1) in the splittable PDF file being generated. In the example of FIG. 9, the encryption dictionary 701 and the ID information 702 are inserted before first-page objects 905-1 in the splittable PDF file 900.

The encryption dictionary 701 and the ID information 702 may be attached to the header 903 of the splittable PDF file 900 or attached to the beginning of a body 904 of the splittable PDF file 900.

Steps S802 through S804 may be performed after steps S805 through S808 are completed.

In steps S805 through S808, the page arranger 413 of the cloud server 101 arranges multiple sets of encrypted page data (objects) in page order and attaches identification information for identifying page data boundary to each set of page data.

For example, in step S805, the page arranger 413 reads objects of each page included in the encrypted PDF file.

At step S806, the page arranger 413 arrange the read objects in page order.

At step S807, the page arranger 413 attaches identification information for identifying page data boundary to the objects of the page.

At step S808, the page arranger 413 determines whether all pages have been processed. If all pages have not been processed, the page arranger 413 repeats steps S805 through S807. If all pages have been processed, the process proceeds to step S809.

Through the above steps, page objects are arranged in page order. In the example of FIG. 9, first-page objects 905-1, second-page objects 905-2, . . . , and Nth-page objects 905-$n$ (n indicates the number of pages) are arranged in this order.

Also in the example of FIG. 9, a page object 906 is attached to objects of each page as identification information for identifying page data boundary.

FIGS. 10A through 10D are drawings used to describe identification information for identifying page data boundaries according to the first embodiment. Here, two examples of identification information for identifying page data boundary (hereafter referred to as "boundary information") are described.

Figure 10A:
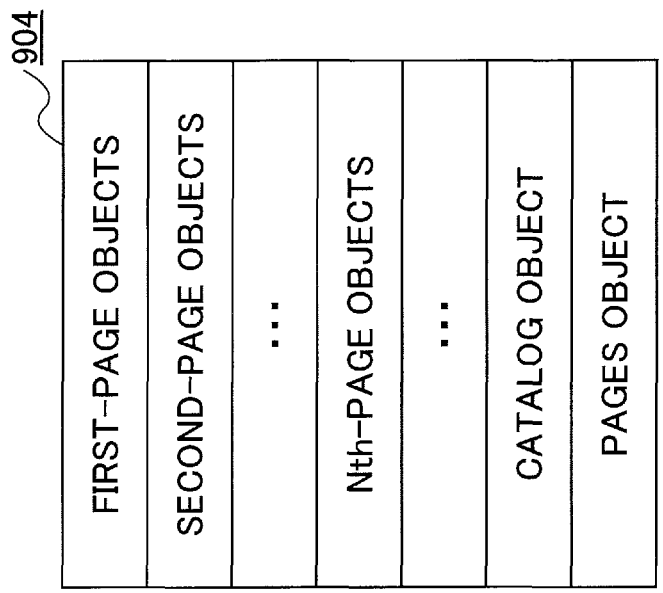
FIGS. 10A through 10D are drawings used to describe identification information for identifying page data boundaries according to the first embodiment.
Figure 10B:
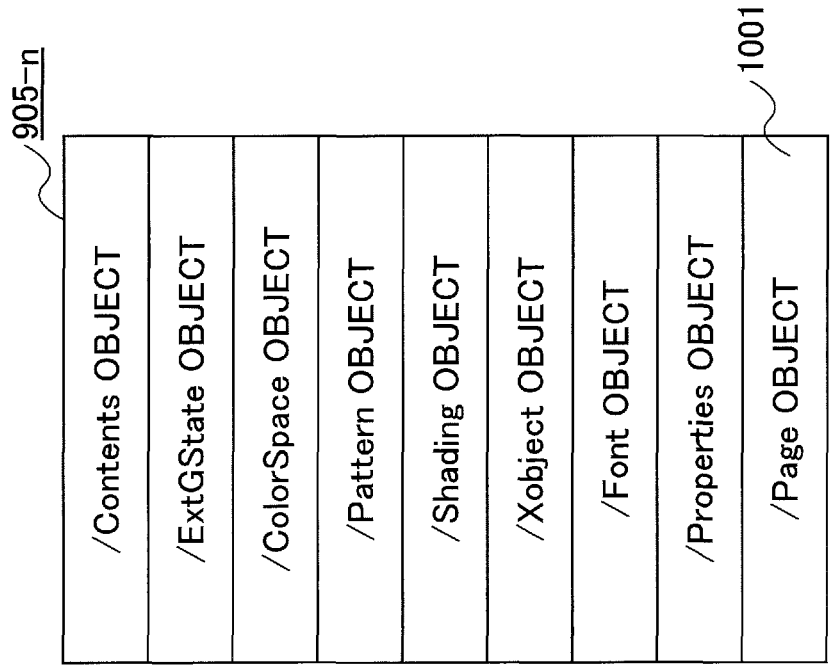

In a first example, predetermined object information is used as boundary information. FIG. 10A illustrates the body 904 of the splittable PDF file 900. FIG. 10B illustrates the Nth-page objects 905-$n$ on page "n" of the splittable PDF file 900.

In the example of FIGS. 10A and 10B, "/Page object" defined in the PDF language specification is used as boundary information. For example, the page arranger 413 of the cloud server 101 extracts "/Page object" of Nth page from Pages objects in the body 904 of FIG. 10A, and attaches the extracted "/Page object" to the end of the Nth-page objects 905-$n$. Alternatively, the page arranger 413 may attach the extracted "/Page object" to the beginning of the Nth-page objects 905-$n$.

Also, the page arranger 413 may attach object information such as "/Contents object" other than "/Page object" to the end or the beginning of page objects as boundary information.

Figure 10D:
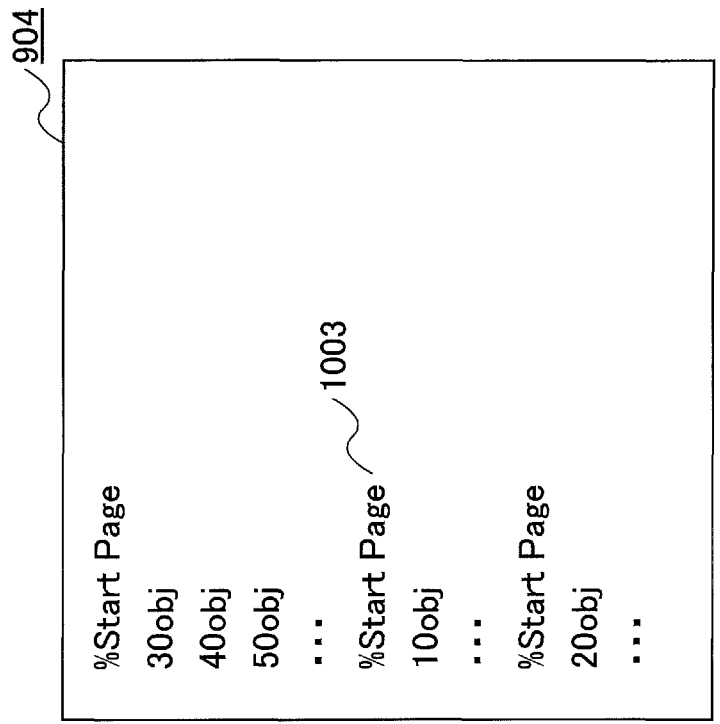
Figure 10C:
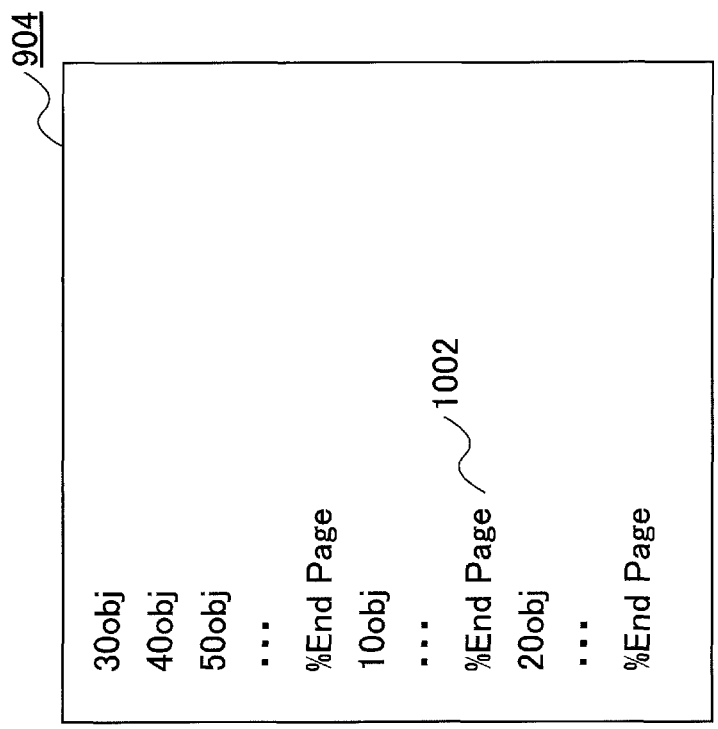

In a second example, a comment indicating a page break is used as boundary information. In the PDF language, a comment indicating a page break is, for example, a character string that does not directly influence page contents to be drawn. FIGS. 10C and 10D are examples of the body 904 of the splittable PDF file 900 where comments indicating page breaks are added.

In the example of FIG. 10C, a comment 1002 "% End Page" indicating a page break is attached to the end of objects of each page. In the example of FIG. 10D, a comment 1003 "% Start Page" indicating a page break is attached to the beginning of objects of each page.

For example, the image forming apparatus 102 can detect these comments when reading the splittable PDF file 900 and identify page data boundaries.

Referring back to FIG. 8, descriptions of the process are continued.

At step S809, the generator 414 of the cloud server 101 updates file configuration information indicating the configuration of the splittable PDF file 900. For example, the generator 414 updates information such as the page tree 907, the document catalog 908, the cross-reference table 909, and the trailer 910. As a result, the splittable PDF file 900 becomes a PDF file that satisfies the PDF language specification and that can be printed even by an image forming apparatus not supporting the splittable PDF file 900.

At step S810, the transmitter 415 of the cloud server 101 transmits the splittable PDF file 900 generated by the generator 414 to the image forming apparatus 102 and requests the image forming apparatus 102 to print the splittable PDF file 900.

(Process Performed by Image forming Apparatus)

Figure 11:
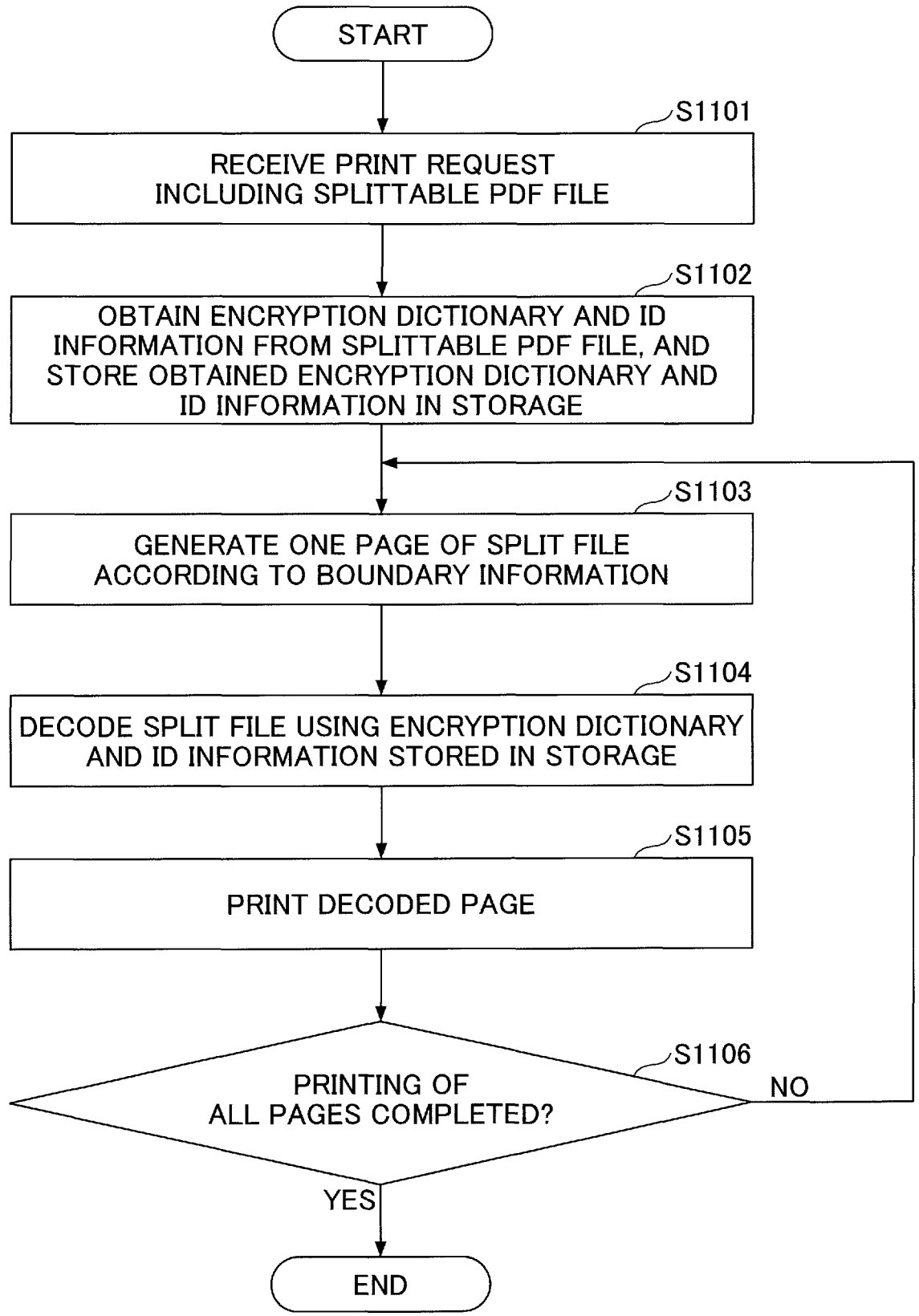
FIG. 11 is a flowchart illustrating a process performed by an image forming apparatus according to the first embodiment.

FIG. 11 is a flowchart illustrating a process performed by the image forming apparatus 102 according to the first embodiment. In this example, the image forming apparatus 102 performs the process upon receiving a print request including the splittable PDF file 900 from the cloud server 101.

At step S1101, the file receiver 422 of the image forming apparatus 102 receives a print request including the splittable PDF file 900 as illustrated in FIG. 9 from the cloud server 101. In this step, the file receiver 422 sequentially stores the splittable PDF file 900 included in the print request in the storage 426 (buffering). Also, the image forming apparatus 102 performs step S1102 without waiting for the completion of the buffering.

Here, it is assumed that the splittable PDF file 900 received from the cloud server 101 includes the splittable PDF file Identification information 902, the ID information 702, and the encryption dictionary 701.

At step S1102, the decoder 424 of the image forming apparatus 102 obtains decoding information such as the encryption dictionary 701 and the ID information 702 from the splittable PDF file 900, and stores the decoding information in the storage 426.

Next, the image forming apparatus performs steps S1103 through S1105 on each page included in the splittable PDF file 900.

At step S1103, the page data generator 423 of the image forming apparatus 102 generates a split file for one page according to the boundary information described with reference to FIGS. 10A through 10D.

At step S1104, the decoder 424 of the image forming apparatus 102 decodes the split file for one page generated by the page data generator 423 by using the decoding information such as the encryption dictionary 701 and the ID information 702 stored in the storage 426.

At step S1105, the image former 425 of the image forming apparatus 102 prints the page represented by the decoded split file by using, for example, the plotter 340 in FIG. 3.

At step S1105, the image forming apparatus 102 determines whether all pages have been printed. If all pages have not been printed, the image forming apparatus 102 repeats steps S1103 through S1105. If all pages have been printed, the image forming apparatus 102 ends the process.

(Process of Generating Split Files)

Figure 12:
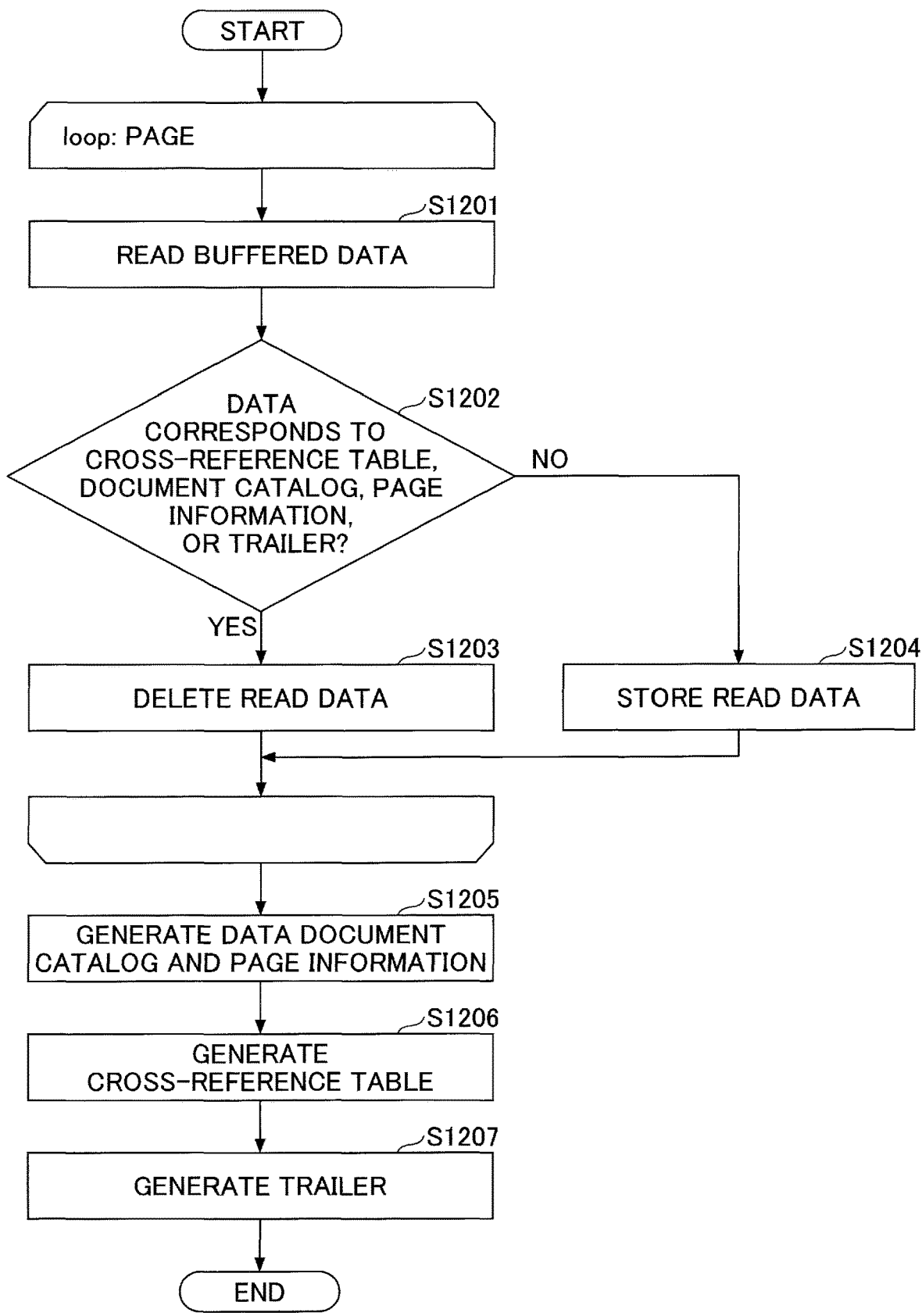
FIG. 12 is a flowchart illustrating a process of generating split files according to the first embodiment.

FIG. 12 is a flowchart illustrating a process of generating split files according to the first embodiment. In this example, the page data generator 423 of the image forming apparatus 102 generates split files for respective pages based on the splittable PDF file 900.

The page data generator 423 of the image forming apparatus 102 performs steps S1201 through S1204 on each page included in the splittable PDF file 900 transmitted from the cloud server 101. The page data generator 423 sequentially performs steps S1201 through S1204 without waiting for the completion of reception of the splittable PDF file 900 transmitted from the cloud server 101.

At step S1201, the page data generator 423 reads, record by record, data buffered at step S1101 of FIG. 11.

At step S1202, the page data generator 423 determines whether the read data is one of the cross-reference table 909, the document catalog 908, page information, and the trailer 910.

If the read data is one of the cross-reference table 909, the document catalog 908, page information, and the trailer 910, the page data generator 423 proceeds to step S1203 and deletes the read data. This is because the cross-reference table 909, the document catalog 908, page information, and the trailer 910 are newly generated in later steps to generate a split file.

If the read data is none of the cross-reference table 909, the document catalog 908, page information, and the trailer 910, the page data generator 423 proceeds to step S1204 and stores the read data in the storage 426.

When steps S1201 through S1204 are completed, page data of a page excluding the cross-reference table 909, the document catalog 908, page information, and the trailer 910 are stored in the storage 426. The page data generator 423 uses the page data stored in the storage 426 as a body of a split file.

The body does not include the cross-reference table 909, the document catalog 908, page information, and the trailer 910 deleted at step S1203. If the body alone is sent as a split file to the image former 425, the image former 425 cannot print the split file because the split file does not conform to the PDF language specification. For this reason, the page data generator 423 generates a PDF file (split file) conforming to the PDF language specification by adding necessary information to the body.

For example, the page data generator 423 generates a header and attaches the header to the beginning of a split file being generated. The header may include, for example, a fixed phrase indicating a PDF version.

At step S1205, the page data generator 423 generates a data document catalog and page information and attaches the data document catalog and the page information to the end of the body.

At step S1206, the page data generator 423 generates a cross-reference table and inserts the cross-reference table after the body in the split file being generated.

At step S1207, the page data generator 423 generates a trailer and attaches the trailer to the end of the cross-reference table to complete the split file conforming to the PDF language specification.

Through the processes described with reference to FIGS. 11 and 12, the image forming apparatus 102 can print the splittable PDF file 900 in the print request received from the cloud server 101. For example, the image forming apparatus 102 obtains decoding information from the splittable PDF file 900, decodes sets of encrypted page data page by page in the order they are received by using the obtained decoding information, and sequentially prints the sets of decoded page data.

As described above, the image processing system 100 of the present embodiment enables an image forming apparatus to print pages in an encrypted document file such as a PDF file while receiving the document file and while maintaining the compatibility of the document file with general image forming apparatuses.

Second Embodiment

In the first embodiment, an already-generated encrypted PDF file is converted by the cloud server 101 into a splittable PDF file. In a second embodiment, a splittable PDF file is generated based on image data obtained by scanning by the image forming apparatus 102.

<System Configuration>

In the second embodiment, a splittable PDF file is generated by the image forming apparatus 102 without using the cloud server 101 in the image processing system 100 illustrated in FIG. 1. Accordingly, in the second embodiment, the image processing system 100 may not necessarily include the cloud server 101.

For example, the client apparatus 103 transmits a scan request to the image forming apparatus 102 to obtain a splittable PDF file including multiple sets of page data that are obtained by scanning and encrypted by the image forming apparatus 102. Also, the client apparatus 103 transmits a print request to the image forming apparatus 102 to request the image forming apparatus 102 to print the obtained splittable PDF file.

In response to the scan request from the client apparatus 103, the image forming apparatus 102 scans multiple images to obtain image data, encrypts the obtained image data, and generate a splittable PDF file including multiple sets of encrypted page data. Also, in response to the print request from the client apparatus 103, the image forming apparatus 102 prints the splittable PDF file.

<Functional Configuration>

Figure 13:
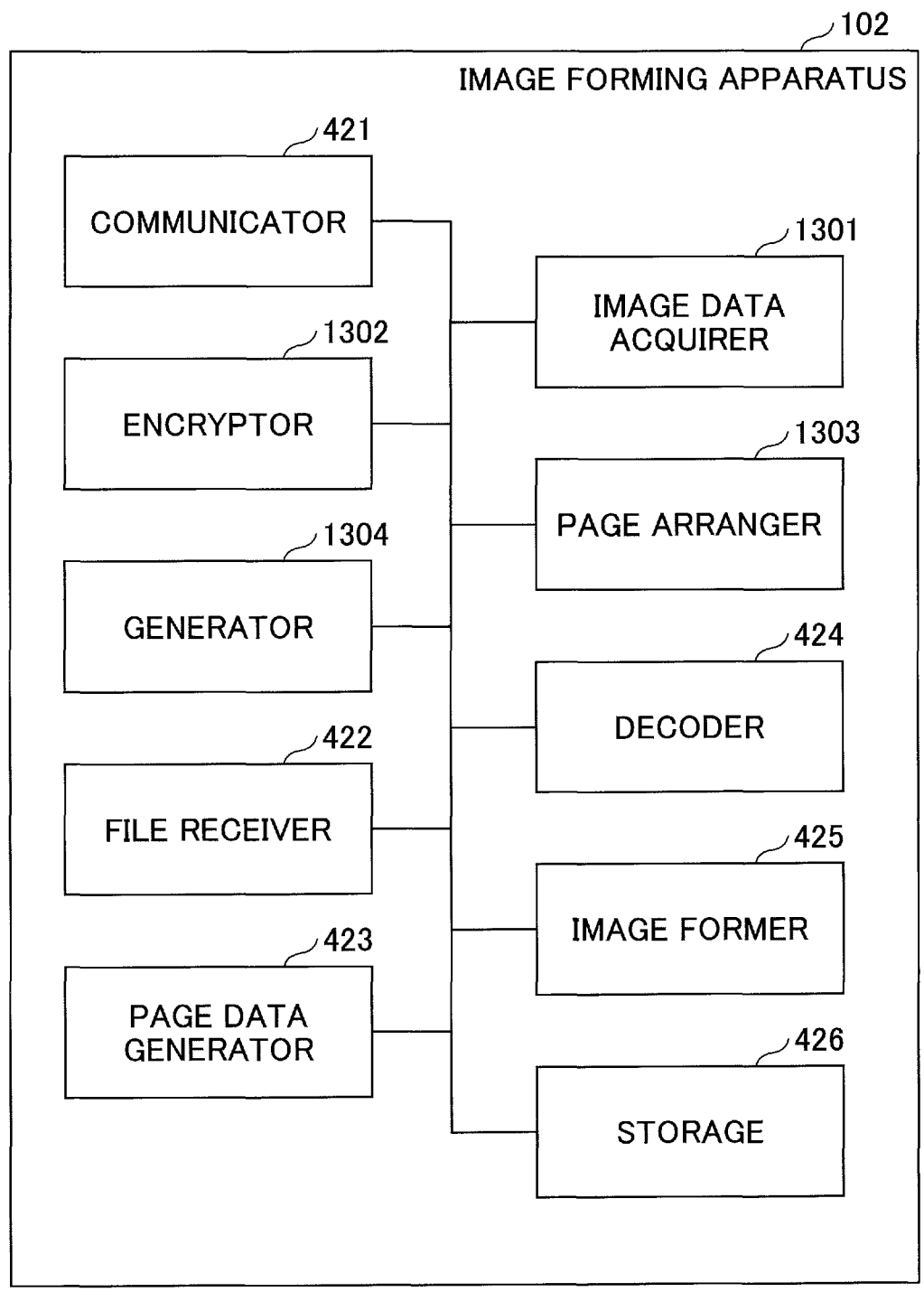
FIG. 13 is a block diagram illustrating a functional configuration of an image forming apparatus according to a second embodiment.

FIG. 13 is a block diagram illustrating a functional configuration of the image forming apparatus 102 according to the second embodiment. As illustrated in FIG. 13, the image forming apparatus 102 of the second embodiment includes an image data acquirer 1301, an encryptor 1302, a page arranger 1303, and a generator 1304 in addition to the functional components of the image forming apparatus 102 of the first embodiment illustrated in FIG. 4.

For example, the image data acquirer 1301, the encryptor 1302, the page arranger 1303, and the generator 1304 of the image forming apparatus 102 may be implemented by executing programs by the CPU 311 in FIG. 3. Also, one or more of the image data acquirer 1301, the encryptor 1302, the page arranger 1303, and the generator 1304 may be implemented by hardware.

The image data acquirer 1301, for example, captures images by using the scanner 350 in FIG. 3 to obtain image data of multiple pages (which is hereafter referred to as "multiples sets of page data").

The encryptor 1302 encrypts the multiple sets of page data obtained by the image data acquirer 1301 according to, for example, PDF specifications.

The page arranger (arranger) 1303 arranges, in page order, the multiple sets of page data encrypted by the encryptor 1302, and attaches boundary information for identifying a page data boundary to each set of page data. The page arranger 1303 corresponds to the page arranger 413 of the cloud server 101 of the first embodiment illustrated in FIG. 4.

The generator 1304 generates a splittable PDF file by inserting decoding information (the encryption dictionary 701 and the ID information 702) for decoding the sets of encrypted page data encrypted by the encryptor 1302 before the sets of encrypted page data.

Preferably, the splittable PDF file generated by the generator 1304 includes file configuration information indicating the configuration of the splittable PDF file after the multiple sets of page data arranged by the page arranger 1303.

Preferably, the splittable PDF file generated by the generator 1304 includes information indicating that the file is a splittable PDF file in, for example, a header disposed before the multiple sets of page data arranged by the page arranger 1303. The generator 1304 corresponds to the generator 414 of the cloud server 101 of the first embodiment illustrated in FIG. 4.

Functional components of the image forming apparatus 102 of the second embodiment other than those described above are substantially the same as the functional components of the image forming apparatus 102 of the first embodiment illustrated in FIG. 4.

<Process Flow>

Next, an image processing method according to the second embodiment is described.

Figure 14:
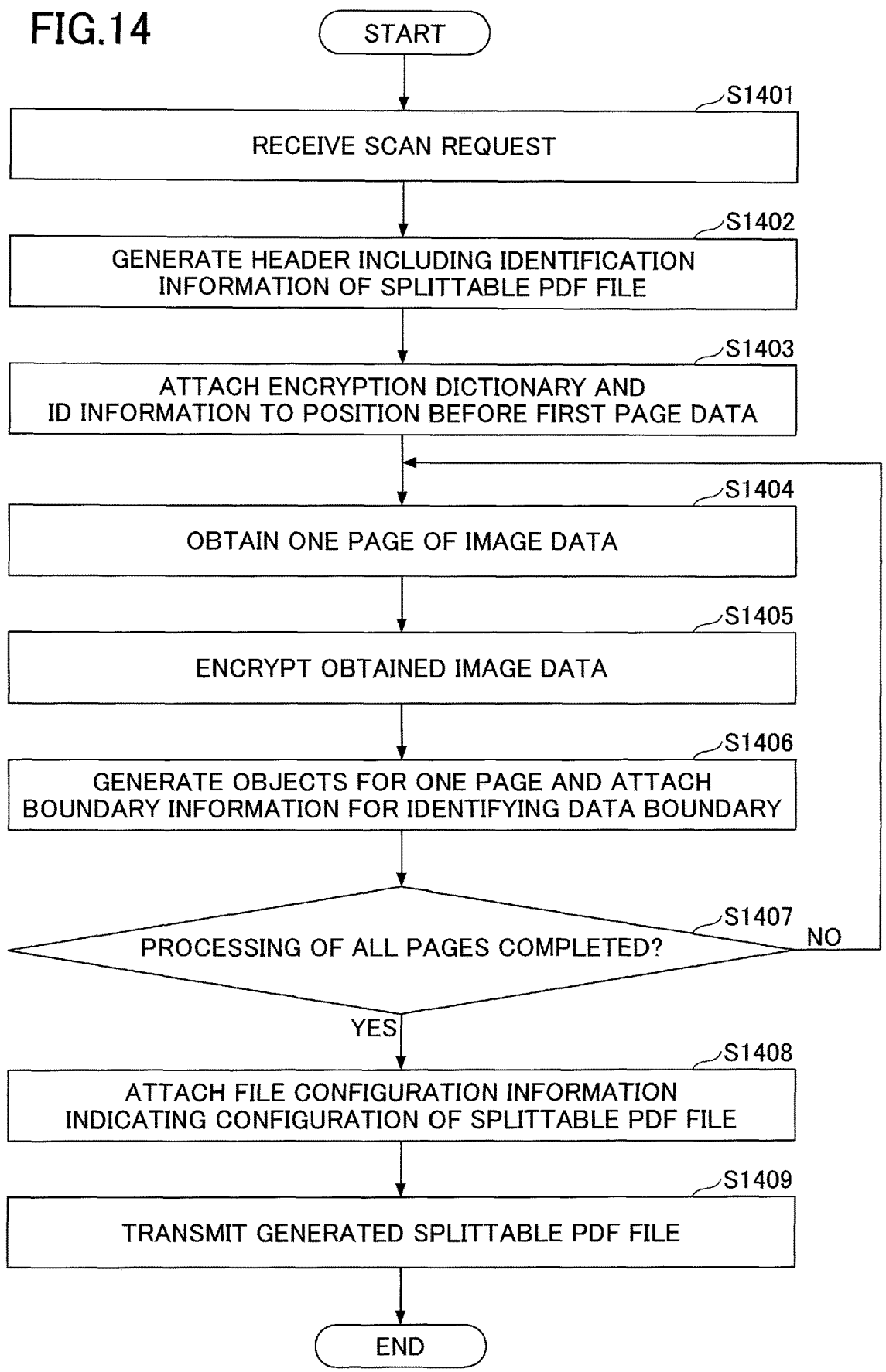
FIG. 14 is a flowchart illustrating a process of generating a PDF file according to the second embodiment.

FIG. 14 is a flowchart illustrating a process of generating a PDF file according to the second embodiment. In this process, in response to a request from the client apparatus 103, the image forming apparatus 102 scans images and generates a splittable PDF file. Detailed descriptions of steps similar to those described in the first embodiment are omitted here.

At step S1401, when the communicator 421 of the image forming apparatus 102 receives a scan request for requesting scanning of images from the client apparatus 103, the image forming apparatus 102 performs step S1402 and the subsequent steps.

At step S1402, the generator 1304 of the image forming apparatus 102 generates a header including identification information of a splittable PDF file. For example, the generator 1304 generates the header 903 in the splittable PDF file 900 of FIG. 9 that includes the PDF header information 901 and the splittable PDF file Identification information 902.

At step S1403, the generator 1304 inserts decoding information such as an encryption dictionary and ID information used for encryption of page data and decoding of encrypted page data before first page data (page data of page 1) in the splittable PDF file being generated. For example, the generator 1304 attaches information such as the encryption dictionary 701 and the ID information 702 in the splittable PDF file 900 of FIG. 9 to the splittable PDF file being generated.

The image forming apparatus 102 performs steps S1404 through S1406 on each page in a document or images to be scanned.

At step S1404, the image data acquirer 1301 of the image forming apparatus 102 obtains image data of one page. For example, the image data acquirer 1301 captures data of a document or images sequentially by using the scanner 350 in FIG. 3 and stores the captured data in the storage 417. Also, the image data acquirer 1301 obtains data of one page (one set of page data) from the data stored in the storage 417.

At step S1405, the encryptor 1302 of the image forming apparatus 102 encrypts the one set of page data obtained by the image data acquirer 1301.

At step S1406, the page arranger 1303 of the image forming apparatus 102 generates objects for one page including the one set of page data encrypted by the encryptor 1302 and attaches boundary information for identifying a data boundary to the objects for one page. For example, the page arranger 1303 generates the first-page objects 905-1 included in the splittable PDF file 900 illustrated in FIG. 9 and attaches the page object 906 to the first-page objects 905-1.

At step S1407, the page arranger 1303 determines whether all pages have been processed. If all pages have not been processed, the page arranger 1303 repeats steps S1404 through S1406. If all pages have been processed, the process proceeds to step S1408.

At step S1408, the generator 1304 of the image forming apparatus 102 generates file configuration information indicating the configuration of the splittable PDF file being generated, and attaches the file configuration information to the splittable PDF file. For example, the generator 1304 generates information such as the page tree 907, the document catalog 908, the cross-reference table 909, and the trailer 910 in the splittable PDF file 900 of FIG. 9, and attaches the generated information to the splittable PDF file.

At step S1409, the communicator 421 of the image forming apparatus 102 transmits the splittable PDF file generated by the generator 1304 to the requesting client apparatus 103.

As described above, the image forming apparatus 102 of the second embodiment can generate a splittable PDF file based on image data obtained by scanning.

An aspect of this disclosure may also provide a non-transitory computer-readable storage medium storing a program for causing a computer to execute processes described above with reference to FIGS. 8, 11, 12, and 14.

An information processing apparatus, an image forming apparatus, an image processing system, an image processing method, and a storage medium according to embodiments of the present invention are described above. However, the present invention is not limited to the specifically disclosed embodiments, and variations and modifications may be made without departing from the scope of the present invention.

What is claimed is:

1. An information processing apparatus communicating with an image forming apparatus, the information processing apparatus comprising:
   a memory that stores a program; and
   a processor that executes the program stored in the memory to perform a process including
      receiving a first document file in which multiple sets of encrypted page data of pages are randomly arranged,
      rearranging the sets of the encrypted page data in page order,
      attaching identification information for identifying a page data boundary to an end of each of the rearranged sets of the encrypted page data,
      obtaining decoding information for decoding the sets of the encrypted page data from the first document file,
      generating a second document file including the rearranged sets of the encrypted page data and the decoding information such that the decoding information is disposed in front of all of the rearranged sets of the encrypted page data, and transmitting the generated second document file to the image forming apparatus.

2. The information processing apparatus as claimed in claim 1, wherein the second document file includes file configuration information indicating a configuration of the second document file behind the rearranged sets of the encrypted page data.

3. The information processing apparatus as claimed in claim 1, wherein the second document file includes information indicating a type of the second document file in front of the rearranged sets of the encrypted page data.

4. The information processing apparatus as claimed in claim 1, wherein the decoding information includes an encryption dictionary including information for decoding the sets of the encrypted page data.

5. The information processing apparatus as claimed in claim 1, wherein the decoding information includes identification information for identifying the first document file.

6. An image forming apparatus, comprising:

a storage; and a processor programmed to execute a first process including obtaining multiple sets of page data of pages that are randomly arranged, encrypting the sets of the page data, rearranging the sets of the encrypted page data in page order, attaching identification information for identifying a page data boundary to an end of each of the rearranged sets of the encrypted page data, and generating a document file including the rearranged sets of the encrypted page data and the decoding information such that the decoding information is disposed in front of all of the rearranged sets of the encrypted page data, wherein the processor is programmed to also execute a second process including obtaining the decoding information from the document file and storing the obtained decoding information in the storage, sequentially decoding the rearranged sets of the encrypted page data included in the document file by using the decoding information stored in the storage, and printing the rearranged sets of the page data decoded by the decoding.

7. A non-transitory computer-readable storage medium storing a program for causing a computer communicating with an image forming apparatus to execute a process, the process comprising:

receiving a first document file in which multiple sets of encrypted page data of pages are randomly arranged;

rearranging the sets of the encrypted page data in page order;

attaching identification information for identifying a page data boundary to an end of each of the rearranged sets of the encrypted page data;

obtaining decoding information for decoding the sets of the encrypted page data from the first document file;

generating a second document file including the rearranged sets of the encrypted page data and the decoding information such that the decoding information is disposed in front of all of the rearranged sets of the encrypted page data; and transmitting the generated second document file to the image forming apparatus.

8. The non-transitory computer-readable storage medium as claimed in claim 7, wherein the second document file includes file configuration information indicating a configuration of the second document file behind the rearranged sets of the encrypted page data.

9. The non-transitory computer-readable storage medium as claimed in claim 7, wherein the second document file includes information indicating a type of the second document file in front of the rearranged sets of the encrypted page data.

10. The non-transitory computer-readable storage medium as claimed in claim 7, wherein the decoding information includes an encryption dictionary including information for decoding the sets of the encrypted page data.

11. The non-transitory computer-readable storage medium as claimed in claim 7, wherein the decoding information includes identification information for identifying the first document file.

* * * * *